(12) United States Patent
Rohwedder

(10) Patent No.: US 7,766,392 B2
(45) Date of Patent: Aug. 3, 2010

(54) ARTICULATE CONNECTION PIECE FOR TUBES

(75) Inventor: Horst-Dieter Rohwedder, Stuhr (DE)

(73) Assignee: Airbus Deutschland GmbH (DE)

( * ) Notice: Subject to any disclaimer, the term of this patent is extended or adjusted under 35 U.S.C. 154(b) by 211 days.

(21) Appl. No.: 11/920,887

(22) PCT Filed: May 26, 2006

(86) PCT No.: PCT/EP2006/005056

§ 371 (c)(1),
(2), (4) Date: Nov. 21, 2007

(87) PCT Pub. No.: WO2006/125667

PCT Pub. Date: Nov. 30, 2006

(65) Prior Publication Data

US 2009/0230676 A1    Sep. 17, 2009

(30) Foreign Application Priority Data

May 27, 2005 (DE) .................. 10 2005 024 414

(51) Int. Cl.
*F16L 51/03* (2006.01)
(52) U.S. Cl. .................. 285/227; 285/226; 285/299
(58) Field of Classification Search ............ 285/49, 285/145.5, 226, 227, 228, 299; 92/37, 38, 92/39, 43
See application file for complete search history.

(56) References Cited

U.S. PATENT DOCUMENTS

| 764,572 | A | * | 7/1904 | Fulton | 92/39 |
| 2,568,923 | A | * | 9/1951 | McNeary et al. | 285/228 |
| 2,873,984 | A | * | 2/1959 | Andersen et al. | 285/228 |
| 2,901,272 | A | * | 8/1959 | Andersen | 285/227 |
| 2,942,896 | A | * | 6/1960 | Hill | 285/228 |
| 2,960,354 | A | * | 11/1960 | Addie et al. | 285/228 |
| 3,206,229 | A | | 9/1965 | Kramer | |
| 3,241,868 | A | * | 3/1966 | Soderberg | 285/228 |
| 3,359,016 | A | * | 12/1967 | Sarlls, Jr. | 285/228 |

(Continued)

FOREIGN PATENT DOCUMENTS

CA    1294996 C    1/1992

(Continued)

*Primary Examiner*—James M Hewitt
(74) *Attorney, Agent, or Firm*—Lerner, David, Littenberg, Krumholz & Mentlik, LLP

(57) ABSTRACT

A connection piece for the articulate connection of a first and a second tube, in particular a first and a second tube of a hot air supply system fed from the power unit of an aircraft, with the possibility of compensating for tolerances, wherein an interval between a tube end of the first tube and a tube end of the second tube is enclosed by a sealing mechanism. The tube ends each have a support ring, wherein the support rings are connected to each other by at least two connection elements arranged outside the sealing mechanism. At least two metal bellows are preferably used as the sealing mechanism, which enable almost maintenance-free operation. Steel ropes are preferably used as connection elements. In particular, tubes with a diameter of up to 160 mm, which are intended, depending on the material used, to conduct media with temperatures of up to 8500 C and pressures of up to 20 bars, can be connected in an articulate manner to each other by means of the connection piece.

9 Claims, 2 Drawing Sheets

U.S. PATENT DOCUMENTS

| | | | | |
|---|---|---|---|---|
| 3,369,829 A | * | 2/1968 | Hopkins | 285/227 |
| 3,620,557 A | * | 11/1971 | Sturm | 285/228 |
| 3,871,689 A | * | 3/1975 | Zaderei et al. | 285/189 |
| 5,069,487 A | * | 12/1991 | Sheppard | 285/226 |
| 5,090,746 A | * | 2/1992 | Holzhausen | 285/226 |
| 6,315,332 B1 | * | 11/2001 | Aschoff et al. | 285/227 |

FOREIGN PATENT DOCUMENTS

| | | |
|---|---|---|
| DE | 629 161 C | 4/1936 |
| DE | 1 425 490 | 6/1970 |
| DE | 29 03 570 B1 | 5/1980 |
| DE | 85 35 523 U1 | 2/1987 |
| FR | 2 500 111 A | 8/1982 |
| GB | 988952 A | 4/1965 |
| GB | 1 450 555 A | 9/1976 |
| GB | 2 042 114 A | 9/1980 |
| GB | 2042115 A | 9/1980 |
| JP | 60-43105 A | 3/1985 |
| JP | 10-141565 A | 5/1998 |
| JP | 2000-161561 A | 6/2000 |

\* cited by examiner

ARTICULATE CONNECTION PIECE FOR TUBES

This application claims the benefit of the filing date of German patent application No. 10 2005 024 414.9 filed 27 May 2005, the disclosure of which is hereby incorporated herein by reference.

The invention relates to a connection piece for the articulate connection of a first and a second rube, in particular a first and a second tube of a hot air supply system of an aircraft fed from the power unit, with the possibility of a tolerance equalisation, wherein an interval between a tube end of the first tube and a tube end of the second tube is enclosed by a sealing mechanism.

In known designs of connection pieces for tubes in hot air supply systems fed from power units sealing collars with metal materials are often used, into which collars are inserted additional sealing rings of a plastic material to perform the actual sealing function. Because of the sealing collars with the sealing rings sliding over the tube ends, the tubes are able to move to a limited extent relative to each other. In this case the tube ends are often connected to each other in articulate fashion by internal means of connection and are aligned with each other so that the tubes to be connected may not exceed a certain minimum diameter to ensure that an adequate volumetric flow through the tube can still be guaranteed in the region of the connection piece.

In tubes for hot air supply systems for aircraft fed from the power unit, high temperatures and pressures occur during operation which, combined with the vibrations and movements of the tube sections that occur, relative to each other, result in disproportionately high wear of the plastic sealing rings used, which may in turn lead to leaks that are difficult to detect. This gives rise to a cost that is hardly justifiable today, particularly in areas of aviation relevant to safety, due to intensive inspection and maintenance work associated with the use of the known connection pieces in such tube systems.

Moreover, the space available for integrating the connection pieces is often extremely limited, and in many cases tubes having a small diameter have to be movably connected together so that connection pieces with internal means of connection, with their flow resistances that are too high for small tube diameters, are not suitable for this application. Furthermore, it should be possible, to a large degree, to equalise relative movements of the tubes to each other in articulate fashion. Finally, an additional equalisation of tolerances is often required in order to be able compensate for inaccuracies within the target system due to production conditions during assembly of the tube systems.

An object of the invention is therefore to provide a connection piece which largely avoids the disadvantages of the known solutions for connection pieces described above, and which meets the design requirements set out above as fully as possible.

This object is achieved by reference to the disclosure herein.

Because both lube ends each have a support ring, and the support rings are connected to each other by at least two connecting means arranged outside the sealing mechanism, the connection piece according to the invention can be used to connect tubes with a relatively small diameter, since no means of connection arranged inside the tubes to be connected are required that could reduce the flow resistance in the region of the connection piece.

In the region of the tube ends the support rings are connected rigidly to them, for example by means of a peripheral welded seam or the like, so that the connection is gas and pressure tight.

According to an advantageous embodiment of the connection piece the means of connection are designed so that they are flexible, at least in sections.

The securing of the opposing tube ends by means of cords that are of flexible design, at least in sections, outside the sealing mechanism, allows a high degree of articulation of the tube ends connected by means of the connection piece of the invention.

According to a further advantageous embodiment, the sealing mechanism is formed with at least two metal bellows connected by a central piece.

The metal bellows first enable a hermetic, gas- and pressure-tight seal to be provided for the interval between the tubes to be connected, which seal, as already explained above, is durable and also almost maintenance-free throughout its service life. The use of two metal bellows allows movement of the connection piece that extends beyond a bending movement, because in the case of two metal bellows arranged one behind the other, the longitudinal axes of the tubes are able to be displaced parallel with each other. When metal bellows are used as a sealing mechanism the connection piece of the invention is, moreover, almost wear- and maintenance-free.

A further advantageous embodiment provides that the central piece is of annular design, and has peripheral end lips on both sides, at least in sections, which lips extend into inner regions of the rubes.

The central piece, with the end lips arranged in it, preferably throughout its periphery, permits effective centring and/or alignment of the tube ends with each other. Furthermore, the end lips reduce any areas of friction.

According to a further advantageous embodiment, the means of connection are arranged in the region of the peripheral areas of the support rings so that they are spaced essentially uniformly apart, This design enables the forces to be transmitted in an optimum manner between the tube ends with a high degree of symmetry.

According to a further advantageous embodiment, the means of connection between the support rings run essentially parallel with a longitudinal axis of the first rube and a longitudinal axis of the second tube. This arrangement also serves to increase the degree of symmetry of the connection piece of the invention in order to improve the transmission of forces between the tubes to be connected.

According to a further embodiment of the invention, the means of connection have start fittings which can be secured in a support ring.

Forces originating from the support rings can be effectively transmitted by the start fittings to the means of connection.

According to a further advantageous embodiment, the start fittings have adjusting means for adjusting a width of the interval. The adjusting means allow better adaptation of the connection piece of the invention to different installation spaces with predetermined dimensions, and also enable production tolerances to be compensated for.

A further advantageous embodiment provides that the means of connection have end fittings which are incorporated displaceably in a support ring to compensate for relative movements between the first and the second tubes. This largely prevents the means of connection formed, for example, with flexible steel ropes or the like, from being loaded with compressive forces, whereas the means of connection are preferably loaded with tensile forces which are generated mainly during operation because the connected tubes are driven apart when pressure is exerted.

According to a further advantageous embodiment the end fittings each have a stop means.

This limits the degree to which the tube ends move apart when pressure is exerted and/or when the tube ends move relative to each other.

According to a further advantageous embodiment the means of connection are formed in particular with flexible steel ropes.

This results in a particularly simple design of the means of securing the support rings since the start and end fittings in particular can easily be pressed on steel ropes or the like for secure fastening. In particular preference the means of connection are formed with flexible high grade steel ropes for the purpose of corrosion resistance. Instead of the steel or high grade steel ropes mentioned, the means of connection may be formed, for example, with flexible sections which also have a cross-sectional area that differs from an approximate circular shape. For example, resilient cords or rods of round steel, elongated leaf-shaped elements or the like may serve as means of connection. Where the demands for temperature resistance and/or compressive strength of the connection piece are not too stringent, elastic plastic materials, particularly fibre-reinforced plastics, may also be used.

In the drawing.

In the drawing the same structural elements each have the same reference numbers.

Figure 1:
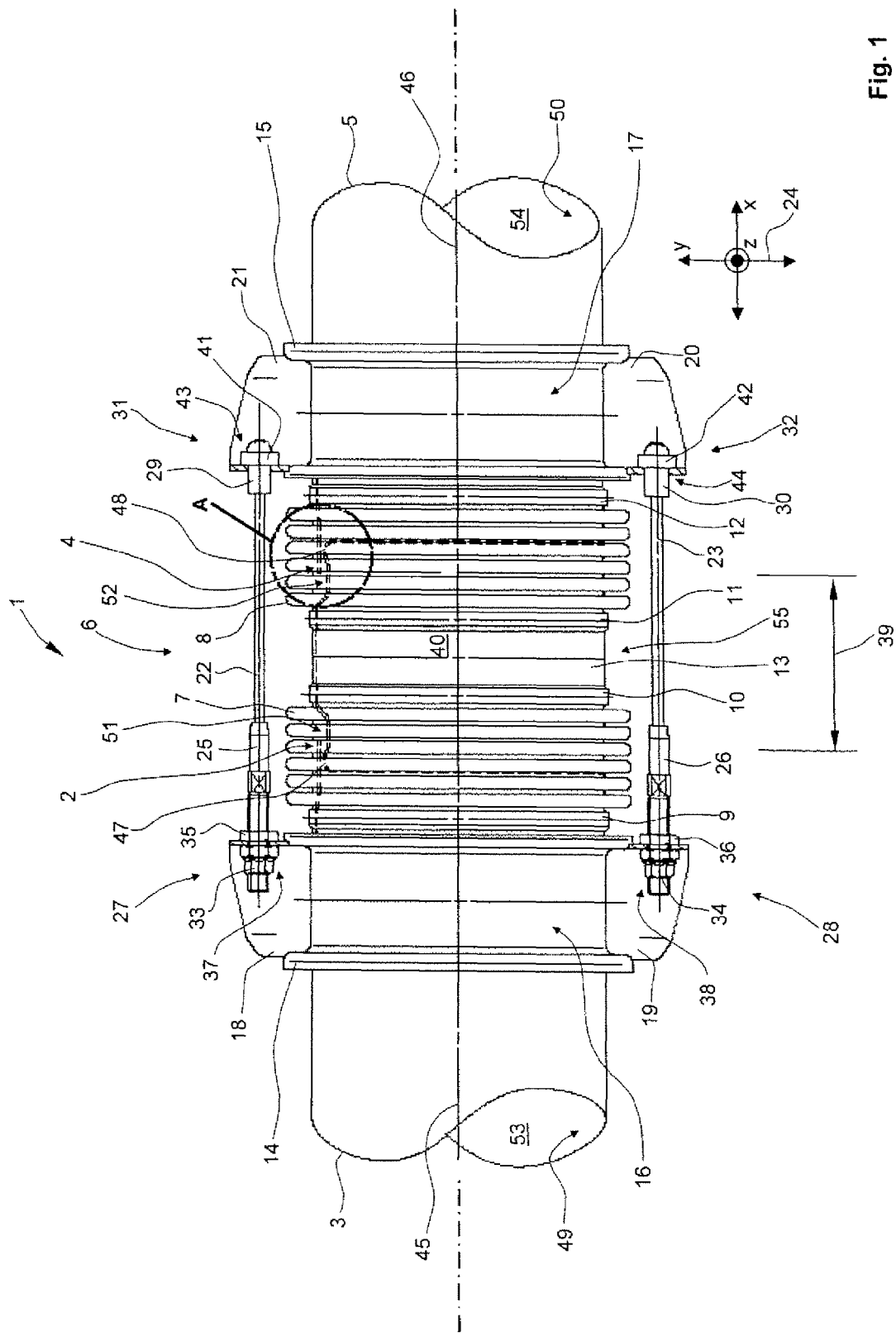
FIG. 1 shows, a side elevation of the connection piece of the invention

FIG. 1 shows a side elevation of the connection piece of the invention. A tube end 2 of a tube 3 is connected by means of connection piece 1 of the invention to a tube end 4 of a second tube 5. The tube ends 2, 4 are enclosed by a sealing mechanism 6 to provide a gas- and pressure-tight seal. Sealing mechanism 6 comprises two metal bellows 7, 8 arranged one behind the other.

Depending on the temperature and/or the pressure of a medium to be conducted through connection piece 1, bellows which are formed from other materials, e.g. with plastics or the like, may be used instead of metal bellows 7, 8.

The metal bellows 7, 8 are provided with fastening flanges 9 to 12. Fastening flange 9 of metal bellows 7 is connected in the region of tube end 2 to first rube 3 by means of a peripheral welded seam, for example, so that it is gas and pressure tight. Correspondingly, fastening flange 12 of metal bellows 8 is connected in the region of tube end 4 to second lube 5 by means of a gas- and pressure-tight welded seam. A central piece 13 is arranged between metal bellows 7, 8. Metal bellows 7, 8 are also rigidly connected with fastening flanges 10, 11 to central piece 13 by means of a peripheral gas- and pressure-tight welded seam. Because central piece 13 is partially covered by metal bellows 7, 8, central piece 13 is partially represented by dotted lines. Apart from the concertina structure, metal bellows 7, 8 each have an essentially hollow cylindrical design.

Furthermore, support rings 14, 15 are arranged in the region of the opposing tube ends 2, 4. Support rings 14, 15 are also preferably rigidly connected in the region of tube 2, 4 ends to tubes 3, 5 by means of a peripheral gas- and pressure-tight welded seam. Mountings 18 to 21 are secured to two peripheral areas of support rings 14, 15 by means of a welded joint, for example. Mountings 18 to 21 may also be formed integral with support rings 14, 15, for example by casting, forging or the like. Instead of the welded seams, metal bellows 7, 8 and support rings 14, 15 may also be connected gas and pressure tight to tube ends 2, 4 by flanging, shrinking on or similar methods.

In the exemplary embodiment shown, support rings 14, 15 are connected to each other, in articulate or movable fashion, by means of two steel ropes 22, 23. Coordination system 24 is shown to illustrate the position of the x-, y- and z-axes in the space.

Other flexible means of connection; such as flexible sections with any cross-sectional geometries, for example round bars of spring steel, spiral springs, leaf springs or the like, may also be used. Where the demands for compressive strength and temperature resistance of the connection piece are not too high, fibre-reinforced plastic materials in particular may also be used. The decisive factor here is that the means of connection must have a flexible and/or spring elastic design at least in sections in the transverse direction to the x-axis. Steel ropes 22, 23 as means of connection generally meet this requirement very well in the case of relatively small diameters and adequate lengths in the direction of the x-axis. The diameter and length of steel ropes 22, 23 are dimensioned relative to each other as a function, in particular, of the pressure prevailing in tubes 3, 5, and hence also in connection piece 1, and of the distance between tube ends 2, 4.

Steel ropes 22, 23 are provided with start fittings 25, 26, with adjusting means 27, 26 and end fittings 29, 30, with stop means 31, 32. Start fittings 25, 26 and end fittings 29, 30 are secured to ends of steel ropes 22, 23, by pressing on, for example. Alternative fastening methods are also possible. Start fittings 25, 26 have a screw thread or the like so that steel ropes 22, 23 can be secured by threaded nuts 33, 34 and lock nuts 35, 36 in holes 37, 38 in the mountings 18, 19. The screw threads on the start fittings 25, 26, together with threaded nuts 33, 34 and the lock nuts 35, 36, form the actual means of adjustment 27, 28 by means of which a width 39 of an interval 40 between the tube, ends 2, 4 is continuously variable for compensating for tolerances in a direction parallel with the x-axis. Moreover, only the interval 40 allows a relative movement between tube ends 2, 4.

The end fittings 29, 30 are provided, for example, with washers 41, 42 as stop means 31, 32 for limiting a movement of tube ends 2, 4 apart, from each other parallel with the x-axis. For this purpose the washers 41, 42 have a greater diameter than holes 43, 44 in mountings 20, 21. Holes 37, 38 preferably have approximately the same diameter as the holes 43, 44, so that the steel ropes 22, 23 can also be offset 180° between the support rings 14, 15. The washers 41, 42 may, if necessary, be designed integral with the end fittings 29, 30 and can be manufactured by casting or upsetting processes.

Moreover, the start fittings 25, 26 may be secured in the holes 37, 38 of the mountings 18, 19 by other means, instead of with the threaded nuts 33, 34 and the lock nuts 35, 36, in order to vary an effective length of the steel ropes 22, 23 and/or for adjusting the length of steel ropes 22, 23.

The end fittings 29, 30 are also received displaceably in the holes 43, 44 parallel with the x-axis, so that the steel ropes 22, 23 are loaded essentially with tensile forces, and not with compressive forces, regardless of the operating condition of the connection piece 1.

Because the support rings 14, 15 are secured by means of the flexible steel ropes 22, 23, longitudinal axes 45, 46 of the first and the second tubes 3, 5 are initially able to move parallel with the y-axis, wherein the longitudinal axes 45, 46 essentially retain their parallel orientation with each other in the space. In this case relative movements of the tube ends 2, 4 of the order of up to 10 mm are possible parallel with the y-axis. In addition, the tubes 3, 5 may also be "buckled" in the region of connection-piece 1 wherein the longitudinal axes 45, 46 may form angles of up to 20°. Movements of tube ends 2, 4 parallel with the x-axis are essentially only limited only by the expandability and/or upsetting capacity of the metal bellows 7, 8 and by the effective length of the steel ropes 22, 23, which are pre-adjusted with the adjusting means 27, 28 and the stop means 31, 32. The tube ends 2, 4 may in this case move parallel with the x-axis up to 10 mm relative to each other. However, compensation for torsional movements between the tube ends 2, 4 about the x-axis is not provided, however, because the metal bellows 7, 8 are not designed for such torsional loads.

The central piece 13, which is preferably annular or hollow cylindrical in design, as indicated in the representation in FIG. 1 by dotted lines, is enclosed on all sides by the metal bellows 7, 8 so that it is hermetically sealed. The central piece 13 is provided on both sides with preferably continuously peripheral end lips 47, 48. The end lips 47, 48 extend beyond the tube ends 2, 4 into the first and the second tubes in any adjustment and movement of the connection piece 1, but do not generally touch the inner faces 49, 50 of the first and the second tubes 3, 5 in the extended condition of the connection piece 1 shown.

The end lips 47, 48 do not generally touch the inner faces 49, 50 of the first and the second tubes 3, 5 until the tube ends 2, 4 display relative movements to each other. Rather there is a narrow peripheral gap between the end lips 47, 48 and the inner faces 49, 50 to guarantee that the tube ends 2, 4 of the first and the second tubes 3, 5 can still move adequately relative to each other, whilst at tire same time minimising any areas of friction. In a region behind the end lips 47, 48 of the central piece 13 peripheral, annular recesses 51, 52 each connect to the end lips 47, 48. The provision of recesses 51, 52 ensure, essentially, that when the tubes 3, 5 move relative to each other the inner faces 49, 50 of the tubes 3, 5 only come into contact with these inner faces in the region of the end lips 47, 48. Both the end lips 47, 48 and the recesses 51, 52 may be inserted in the central piece 13 by known transformation methods, e.g. stamping, deep drawing, upsetting or the like. Apart from the end lips 47, 48 and the recesses 51, 52, as described above, the central piece 13 has an essentially hollow cylindrical, geometrical design.

The recesses 51, 52 generally improve tire mobility of the connection piece 1 and minimise the size of any areas of friction. The central piece 13 serves essentially to guide and centre the metal bellows 7, 8 relative to each other. This ensures, among other things, that angles formed between the longitudinal axes 45, 46 and any parallel displacements between the longitudinal axis 45 and the longitudinal axis 46, parallel with the y-axis in the case of articulate movements between the tube ends 2, 4, do not make such large contributions in this respect that the mechanical integrity of the metal bellows 7, 8 is permanently impaired.

In the region of the end lips 47, 48 the central piece 13 has a slightly smaller diameter than an inside diameter of the tubes 3, 5 so that the end lips 47, 48 can extend at least slightly into the inner regions 53, 54 of the tubes 3, 5. In the region of a central section 55 of the central piece 13, an outside diameter of the central piece 13 roughly corresponds to an outside diameter of the first and the second tube 3, 5. In the region of the recesses 51, 52, an outside diameter of the central section 13 is preferably slightly smaller than an outside diameter of the central section 13 in the region of the end lips 47, 48. Dimensional conditions deviating from this are possible.

The connection piece 1 of the invention is ideally suited for the articulate connection of tubes 3, 5 that have an outside diameter of up to approximately 160 mm, wherein the media to be conducted through them have pressures of up to 20 bars and temperatures of up to 850° C., depending on the materials used for the sub-components of the connection piece 1. The load values mentioned are achievable if metal materials, particularly titanium, high grade steel, steel alloys capable of supporting extreme loads and temperature resistant aluminium alloys, that can be adequately loaded mechanically, are used for the first and the second tubes 3, 5, the metal bellows 7, 8, the support rings 14, 15 and the central piece 13.

If tubes 3, 5 with a larger outside diameter than 50 mm are to be connected in an articulate manner, it is possible, instead of the two steel ropes 22, 23 shown, to arrange three or more steel ropes, preferably uniformly distributed, over peripheral areas 16, 17 of the support rings 14, 15. Due to the fact that the articulate connection between the tube ends 2, 4 is possible without connecting elements in the inner regions 53, 54 of the first and the second tubes 3, 5, an extremely small flow resistance of the connection piece 1 of the invention is obtained.

Figure 2:
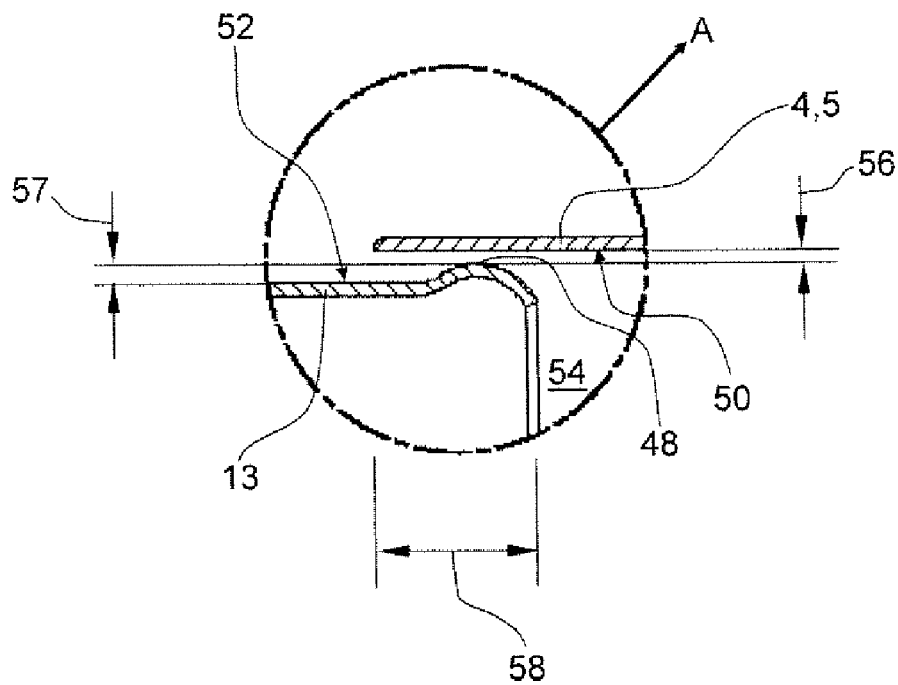
FIG. 2 shows an enlarged representation of drawing area A in FIG. 1.

FIG. 2 shows an enlarged representation of the drawing area A in FIG. 1, wherein the connection piece 1 is in the extended position.

The central piece 13 rests almost on the inner face 50 of the second tube 5 in the region of the tube end 4 with the end lip 48, separated by a narrow gap 56, but without touching this inner face 50 directly. The width of gap 56 may be as much as 10 mm, depending on the degree of the mobility of the connection piece 1 to be obtained, and/or the angles to be bridged between the first and the second tubes 3, 5. For other applications larger gap dimensions can be bridged with the connection piece 1 of the invention. In the region of recess 52 the central piece 13, as also shown in FIG. 2, has a smaller outside diameter than in the region of the end lip 48.

The height 57 of the end lip 48 must ensure, in relation to an upper side, of the recess 52, that in every possible operating condition of the connection piece 1 only the end lip 48 touches the inner face 50 of the second tube 5. In this case the end lip 48 always extends a short distance into the tube end 4 of the second tube 5 to provide the articulate property and/or mobility of the connection piece 1. In the representation in FIG. 2 the central pieces 13 extends with a length 58 into the tube end 4, to illustrate this situation, which length guarantees adequate guidance and prevents the tube ends 2, 4 a canting and/or a seizing each other and therefore guarantees the articulate property of the connection piece 1 under all circumstances. Corresponding considerations apply to the end lip 47 of the central piece 13, not shown in FIG. 2, in relation to the inner face 49 of the first tube 3.

Figure 3:
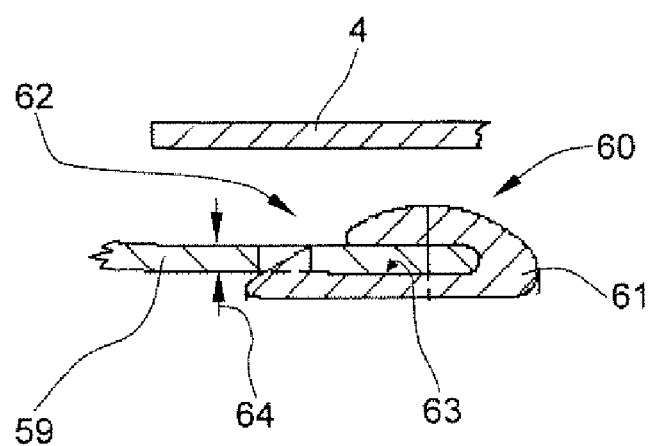
FIG. 3 shows a representation of a further design variant of a central piece with inner lips.

FIG. 3 shows an embodiment of an end lip on a central piece. In contrast to the central piece 13, the central piece 59 shown has an essentially hollow cylindrical outer shape and has no recesses, produced for example by stamping or the like, and no end lips formed by upsetting or the like. This provides, among other things, a simplified method of producing the central piece 59, which is an advantage particularly if titanium or high grade steel is used.

An end lip 60 of the central piece 59 is in this case formed by sliding on a suitably shaped, separate sliding ring 61, which has roughly the cross-sectional geometry shown in FIG. 3. In order to fasten the sliding ring 61 on an end region 62 of the central piece 59, the latter is provided on one side with a peripheral groove 63 whose width is preferably slightly smaller than a material thickness 64 of the central piece 59, in order to guarantee sufficiently secure fastening of the sliding ring 61 on the central section 59 under all conceivable operating conditions of the connection piece 1.

For additional securing of the sliding ring 61 on the central section 59, the sliding ring 61 may have stop means, not shown in detail in FIG. 3, which can be engaged with correspondingly designed stopping mechanisms of the central section 59. A second end lip of the central section 59, not shown in FIG. 3, has the same design structure as the end lip 60.

The sliding ring 61 is formed from a plastic material or corresponding metal material which preferably has low sliding friction values. The sliding ring 61 significantly reduces the risk of abrasion or the like occurring due to the sliding friction processes that are unavoidable in this structure as a result of the relative movements between the inner faces 49, 50 of the first and the second tubes 3, 5 respectively and the central sections 13, 59. Here the central sections 13, 59 can no longer be manufactured integrally but they each have two separate sliding rings.

The connection piece 1 of the invention is provided in particular for connecting the tubes 3, 5 with an outside diameter of tip to 160 mm in hot air supply systems fed from the power unit, in which hot air is conducted through the rubes 3, 5 at a temperature of up to 260° C. and at pressures of up to 6.5 bars.

The individual sub-components of the connection piece 1, in particular the central section 13, the support rings 14, 15, the mountings 18 to 21, the fastening flanges 9 to 12, the metal bellows 7, 8, the stop and end fittings 25, 26, 29, 30, the threaded nuts 33, 34, the lock nuts 35, 36 and the washers 41, 42, are preferably made from titanium. The first and the second tubes 3, 5 are preferably also made from titanium.

Alternatively high strength, temperature resistant steel alloys, high grade steel alloys or mechanically high strength and adequately temperature resistant aluminium alloys may be used for all the sub-components of the connection piece 1 and the first and the second tubes 3, 5 mentioned. The steel ropes 22, 23 may consist of high strength steel, spring steel or high grade steel.

Regardless of the articulate connection of the tubes 3, 5, the connection piece 1 of the invention may absorb tensile forces of up to 10,000 N. On the other hand, compressive forces cannot be absorbed to any appreciable degree by the connection piece 1 because of the steel ropes 22, 23 as means of connection, which are essentially subjected to tensile load only.

LIST OF REFERENCES

1. Connection piece
2. Tube end
3. First tube
4. Tube end
5. Second tube
6. Sealing mechanism
7. Metal bellows
8. Metal bellows
9. Fastening flange
10. Fastening flange
11. Fastening flange
12. Fastening flange
13. Central piece
14. Support ring
15. Support ring
16. Peripheral surface
17. Peripheral surface
18. Mounting
19. Mounting
20. Mounting
21. Mounting
22. Steel rope
23. Steel rope
24. System of coordinates
25. Start fitting
26. Start fitting
27. Adjusting means
28. Adjusting means
29. End fitting
30. End fitting
31. Stop means
32. Stop means
33. Threaded nut
34. Threaded nut
35. Lock nut
36. Lock nut
37. Hole
38. Hole
39. Width
40. Interval
41. Washer
42. Washer
43. Hole
44. Hole
45. Longitudinal axis (first tube)
46. Longitudinal axis (second tube)
47. End lip
48. End lip
49. Inner face
50. Inner face
51. Recess
52. Recess
53. Inner region
54. Inner region
55. Central section (central piece)
56. Gap
57. Height
58. Length
59. Central piece
60. End lip
61. Sliding ring
62. End region
63. Groove
64. Material thickness

The invention claimed is:

1. A connection piece for the articulate connection of a first tube and a second tube, the first tube and second tube each having support rings, comprising:
   a sealing mechanism which encloses an interval between a tube end of the first tube and a tube end of the second tube,
   at least two connection means arranged outside the sealing mechanism, the connection means connecting the support rings to each other;
   wherein the sealing mechanism comprises at least two metal bellows connected by a central piece configured to compensate for tolerances; and
   wherein the central piece is of annular design and comprises continuously or sectionwise peripheral end lips on both sides, which lips extend into inner regions of the tubes.

2. The connection piece according to claim 1, wherein the connection means are of flexible design.

3. The connection piece according to claim 1, wherein the connection means are arranged to be spaced uniformly apart in the region of peripheral surfaces of the support rings.

4. The connection piece according to claim 1, wherein the connection means between the support rings run essentially parallel with a longitudinal axis of the first tube and a longitudinal axis of the second tube.

5. The connection piece according to claim 1, wherein the connection means have start fittings which can be connected to a support ring.

6. The connection piece according to claim 5,
wherein at least one of said start fittings has adjusting means for adjusting a width of the interval.

7. The connection piece according to claim 1, wherein the connection means comprise end fittings which are slidably received in a mounting of a support ring to compensate for relative movements between the first and the second tube.

8. The connection piece according to claim 7,
wherein the end fittings have stop means for limiting a movement of the tube ends apart from each other.

9. The connection piece according to claim 1, wherein the connection means comprise flexible steel ropes.

* * * * *

UNITED STATES PATENT AND TRADEMARK OFFICE
CERTIFICATE OF CORRECTION

| | | |
|---|---|---|
| PATENT NO. | : 7,766,392 B2 | Page 1 of 1 |
| APPLICATION NO. | : 11/920887 | |
| DATED | : August 3, 2010 | |
| INVENTOR(S) | : Horst-Dieter Rohwedder | |

It is certified that error appears in the above-identified patent and that said Letters Patent is hereby corrected as shown below:

Column 3, Line 27 delete the "," following the word shows.

Column 3, Line 51 "lube" should be replaced by --tube--.

Column 5, Line 33 "tire" should be replaced by --the--.

Column 5, Line 46 "tire" should be replaced by --the--.

Column 6, Line 36 the paragraph starting with "The" should continue above as a new sentence following the "." at the end of Line 35.

Column 6, Line 44 "pieces" should be replaced by --piece--.

Signed and Sealed this
Fourth Day of October, 2011

David J. Kappos
*Director of the United States Patent and Trademark Office*